US007641550B2

(12) United States Patent
Ohta

(10) Patent No.: US 7,641,550 B2
(45) Date of Patent: Jan. 5, 2010

(54) GAME DEVICE CHANGING ACTION OF GAME OBJECT DEPENDING ON INPUT POSITION, STORAGE MEDIUM FOR STORING GAME PROGRAM AND METHOD USED IN GAME DEVICE

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1072 days.

(21) Appl. No.: 11/092,769

(22) Filed: Mar. 30, 2005

(65) Prior Publication Data

US 2005/0221893 A1   Oct. 6, 2005

(30) Foreign Application Priority Data

Mar. 31, 2004   (JP)   ............................. 2004-101984

(51) Int. Cl.
  *G06F 17/00*   (2006.01)
(52) U.S. Cl. ........................................................ 463/36
(58) Field of Classification Search ............. 463/30–39; 345/419, 427, 441, 442
  See application file for complete search history.

(56) References Cited

U.S. PATENT DOCUMENTS 7,495,665 B2 *   2/2009   Nogami et al. .............. 345/427

2007/0075985 A1 *   4/2007   Niida .......................... 345/173

FOREIGN PATENT DOCUMENTS

JP       5031256 A    2/1993
JP    2000061142 A    8/2009

* cited by examiner

*Primary Examiner*—Ronald Laneau
(74) *Attorney, Agent, or Firm*—Nixon & Vanderhye PC

(57) ABSTRACT

A game device 1 that executes a game program stored in a storage medium of the present invention detects and stores coordinates on a game image corresponding to an input while the input by the player is detected. Then, based on an input locus having a predetermined shape shown by the stored coordinates, a direction shown by the input locus is calculated. When the direction is calculated, the game device determines whether or not a coordinate of a starting point is included in a predetermined range 35 that is based on coordinates showing a position in which the player object 32 is displayed in the game image. When it is determined that the coordinate of the starting point is included in the predetermined range 35, the player object 32 performs a moving action in the calculated direction. When it is determined that the coordinate of the starting point is not included in the predetermined range 35, the player object 32 performs a kicking action in the calculated direction.

11 Claims, 11 Drawing Sheets

GAME DEVICE CHANGING ACTION OF GAME OBJECT DEPENDING ON INPUT POSITION, STORAGE MEDIUM FOR STORING GAME PROGRAM AND METHOD USED IN GAME DEVICE

TECHNICAL FIELD

The exemplary embodiments disclosed herein relate to a storage medium in which a game program is stored. More specifically, the exemplary embodiments disclosed herein relate to a storage medium in which a game program that can operate a game object using input with a mouse, a touch panel or the like is stored.

BACKGROUND AND SUMMARY

An example of a gamed device that move an object on a screen by input with a touch panel is disclosed in Japanese Laid-Open Patent Publication No. 5-31256. The game of this device is a golf game in which a ball on a screen is moved by input to the touch panel screen with an input pen. In this device, the action of the ball is determined by the moving direction and the moving speed of the input pen when the input pen is brought in contact with the ball. Thus, the player can move the ball in a similar operation sense to an actual stroke.

In many of the recent games, the player is required to operate a plurality of kinds of operations so that a player object operated by the player can perform various actions. For example, there is a game device (e.g., Japanese Laid-Open Patent Publication No. 2000-61142) in which the player object performs different actions, depending on the manner in which the operation lever is input. In this game device, the player makes the player object perform various actions, such as jumping and squatting, by performing an action that is a combination of a plurality of operations, that is, an operation of pushing and pulling of the 3D lever in the vertical direction and an operation of inclining the 3D lever.

In the conventional game devices, in order to let the player object perform a plurality of kinds of actions, it is necessary for the player to perform a plurality of operation patterns in number corresponding to the number of the actions, as described referring to the game device disclosed in Japanese Laid-Open Patent Publication No. 2000-61142. Therefore, as described referring to the game device disclosed in Japanese Laid-Open Patent Publication No. 5-31256, in a device that lets the player perform the game operation by a single operation using a touch panel, a plurality of kinds of game operations cannot be performed without any modification. For example, in order to make the player object perform a plurality of kinds of actions in the device disclosed in Japanese Laid-Open Patent Publication No. 5-31256, it may be necessary for the player to use an input device such as a button, in addition to the touch panel. More specifically, a plurality of operation patterns may be made possible by distinguishing inputting in the touch panel while pressing a button from inputting in the touch panel without pressing a button.

As described, in the conventional game devices, it is necessary for the player to perform a plurality of kinds of game operations by performing a plurality of kinds of actions in order to make the player object perform a plurality of actions. As in this case, when the game operation is complicated, the player has to memorize game operations, and cannot intuitionally perform the game operations. That is to say, in the conventional game devices, in order to make the player object perform a plurality of kinds of actions, the player is required to perform a complicated game operation, which deteriorates the operability of the game.

Therefore, a feature of certain exemplary embodiments is to provide a storage medium for storing a game program for implementing a game that lets a player object perform a plurality of actions with a simple game operation, a game device and a method used in the game device.

Certain exemplary embodiments have the following aspects to attain the feature mentioned above. The parenthesized reference numerals and further notes in this section show the correspondence to the certain exemplary embodiments that are described later to help the understanding of these certain exemplary embodiments and does not limit them in any way.

A first aspect of the certain exemplary embodiments is directed to a storage medium storing a game program that lets a computer of a game device (1) in which a game image including a player object (32) that can be operated by a player is displayed on a display device (first LCD 11) function as input detecting means (CPU core 21 that executes S60 (which is an abbreviation of step 60. The same applies to the following) Hereinafter, only step number is shown), coordinate storing means (S61), direction calculating means (S80), determining means (S64, S68), first action controlling means (S83), and second action controlling means (S85). The input detecting means detects an input by the player. The coordinate storing means detects and stores coordinates on the game image corresponding to the input while the input by the player is detected by the input detecting means. Based on an input locus having a predetermined shape shown by the coordinates stored in the coordinate storing means, the direction calculating means calculates a direction (designated direction) shown by an input locus. The determining means determines whether or not a coordinate of a starting point stored first in the coordinate storing means is included in a predetermined range (determination area 35) that is based on coordinates showing a position in which the player object is displayed in the game image. The first action controlling means controls the player object to perform a first action (moving action) in a direction calculated by the direction calculating means when it is determined that the coordinate of the starting point is included in the predetermined range by the determining means. When it is determined that the coordinate of the starting point is not included in the predetermined range by the determining means, the second action controlling means further determines whether or not any coordinate other than the coordinate of the starting point is included in the predetermined range, and controls the player object to perform a second action (kicking action) in a direction calculated by the direction calculating means when any of the coordinates other than the coordinate of the starting point is included in the predetermined range.

In a second aspect, the first action may be an action of the player object itself (moving action), and the second action may be an action that the player object performs to another player object (ball 33) (kicking action).

In a third aspect, the game image may include the player object and a moving object (ball 33) that is an object different from the player object and moves together with the player object. In this case, the first action is an action in which the player object moves in the direction calculated by the direction calculating means. The second action is an action in which the moving object moves in the direction calculated by the direction calculating means.

In a fourth aspect, the direction calculating means may calculate a direction, using a straight line connecting a coordinate of a starting point and a coordinate of an ending point of the coordinates stored in the coordinate storing means as the input locus.

In a fifth aspect, the direction calculating means may calculate a direction, using a trajectory constituted by coordinates detected at a predetermined time interval of the coordinates stored in the coordinate storing means as the input locus. The predetermined time interval may be, for example, a time interval corresponding to one frame, or may be a time interval corresponding to a frame of a predetermined number of minutes.

The certain exemplary embodiments may be provided as a game device provided with the means realized by executing the above-described game program. The certain exemplary embodiments may be provided as a method used in the game device.

The certain exemplary embodiments let a player object perform different actions, depending on the positional relationship between the starting point of an input locus and the player object when the locus is drawn with a mouse or in a touch panel or the like and is input. That is to say, even if the player performs the same action of drawing the same input locus, different actions can be performed depending on the positional relationship between the starting point and the object. Therefore, the player can instruct the player object to perform two different actions by a simple input operation of a single input pattern.

Furthermore, according to the second aspect, the certain exemplary embodiments can let the player object perform two actions that are of totally different kinds by a simple input operation of a single input pattern.

Furthermore, according to the third aspect, a moving operation with respect to two different objects can be performed by one kind of action.

Furthermore, according to the fourth aspect, since the direction can be calculated based on the starting point and the ending point of the input locus by the player, the direction to be designated can be calculated easily.

Furthermore, according to the fifth aspect, the direction can be calculated based on an input locus close to a locus that is actually input by the player. Therefore, the player can let the player object perform a complicated action by forming a complicated shape as the input locus.

These and other features, aspects and advantages of certain exemplary embodiments will become more apparent from the following detailed description when taken in conjunction with the accompanying drawings.

DESCRIPTION OF THE PREFERRED EMBODIMENTS

Figure 1:
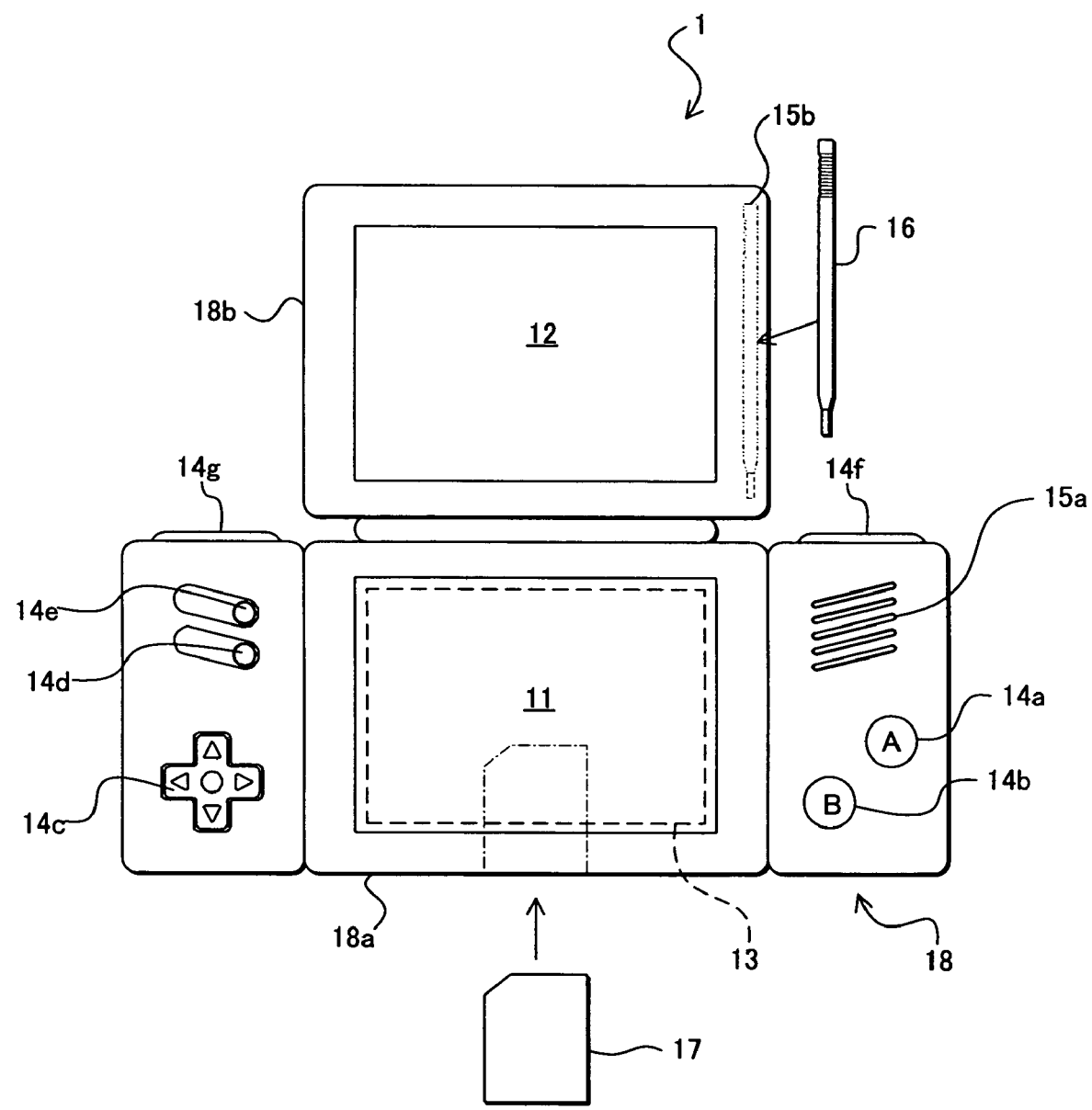
FIG. 1 is an appearance view of a portable game device for executing a game program according to a certain exemplary embodiment.

FIG. 1 is an appearance view of a portable game device for executing a game program according to an exemplary embodiment. In FIG. 1, the game device 1 of this exemplary embodiment is housed in a housing 18 in such a manner that two liquid crystal displays (hereinafter, referred to as "LCD") 11 and 12 are arranged in predetermined positions. More specifically, when a first LCD 11 and a second LCD 12 are arranged in the vertical direction, the housing 18 consists of a lower housing 18a and an upper housing 18b. The upper housing 18b is supported so as to be rotatable in a portion of the upper side of the lower housing 18a. The upper housing 18b has a slightly larger flat-face shape than that of the second LCD 12, and has an opening formed so as to expose the display screen of the second LCD 12 from its main flat-face on one side. The lower housing 18a has an opening formed so as to expose the display screen of the first LCD 11 substantially in the central portion in the horizontal direction. The flat-face shape of the lower housing 18a is selected so as to be longer in the horizontal direction than that of the upper housing 18b. In the lower housing 18a, a sound-through hole 15a of a speaker 15 is formed in either one of the portions sandwiching the first LCD 11, and an operation switch portion 14 is provided in the left and the right that sandwich the first LCD 11.

The operation switch portion 14 includes action switches 14a and 14b that are provided on a main flat-face on one side of the lower housing 18a on the right of the first LCD 11, and a direction designating switch 14c, a start switch 14d, and a selection switch 14e that are provided on a main flat-face on one side of the lower housing 18a on the left of the first LCD 11. The action switches 14a and 14b are used to, for example, instruct a player object to jump, punch, move a weapon or the like in an action game, and to input an instruction for acquisition of an item and selection and determination of a weapon or a command in a roll playing game (RPG) or simulation RPG. The direction designating switch 14c is used to designate a direction on a game screen, such as designating a direction in which a player object (or player character) that can be operated by the player is to move, designating the moving direction of the cursor or the like. If necessary, an action switch can be additionally provided, or side switches 14f and 14g can be provided on the left and the right of the upper surface (upper side surface) of the area in the lower housing 18a in which the operation switches 14 are provided.

Furthermore, a touch panel 13 (area defined by a broken line in FIG. 1) is provided on the top surface of the first LCD 11. The touch panel 13 may be of any kind, for example, a resistive film system, an optical system (infrared ray system), or capacitive coupling system, as long as it detects the coordinate position of a stick 16 and outputs coordinate data when a pressing operation, a moving operation or a touching operation is performed on the top surface thereof with the stick 16 (or possibly with a finger).

A housing hole 15b (dashed double dotted line in FIG. 1) for housing the stick 16 for operation to the touch panel 13, if necessary, is formed near the side of the upper housing 18b. The stick 16 is housed in this housing hole 15b. A cartridge insertion portion (dashed dotted line in FIG. 1) in which a game cartridge 17 (hereinafter, simply referred to as "cartridge 17") containing a memory (e.g., ROM) that stores a game program is removably mounted is formed in a portion of the side of the lower housing 18a. The cartridge 17 is an information storage medium for storing a game program, and for example, a non-volatile semiconductor memory such as ROM or a flash memory can be used for this. A connector (see FIG. 2) for electrical connection to the cartridge 17 is contained inside the cartridge insertion portion. An electronic circuit board on which various electronic components such as CPU are mounted is housed in the lower housing 18a (or possibly in the upper housing 18b). The information storage medium for storing a game program is not limited to the non-volatile semiconductor memory, but may be CD-ROM, DVD, or similar optical disk storage media.

Figure 2:
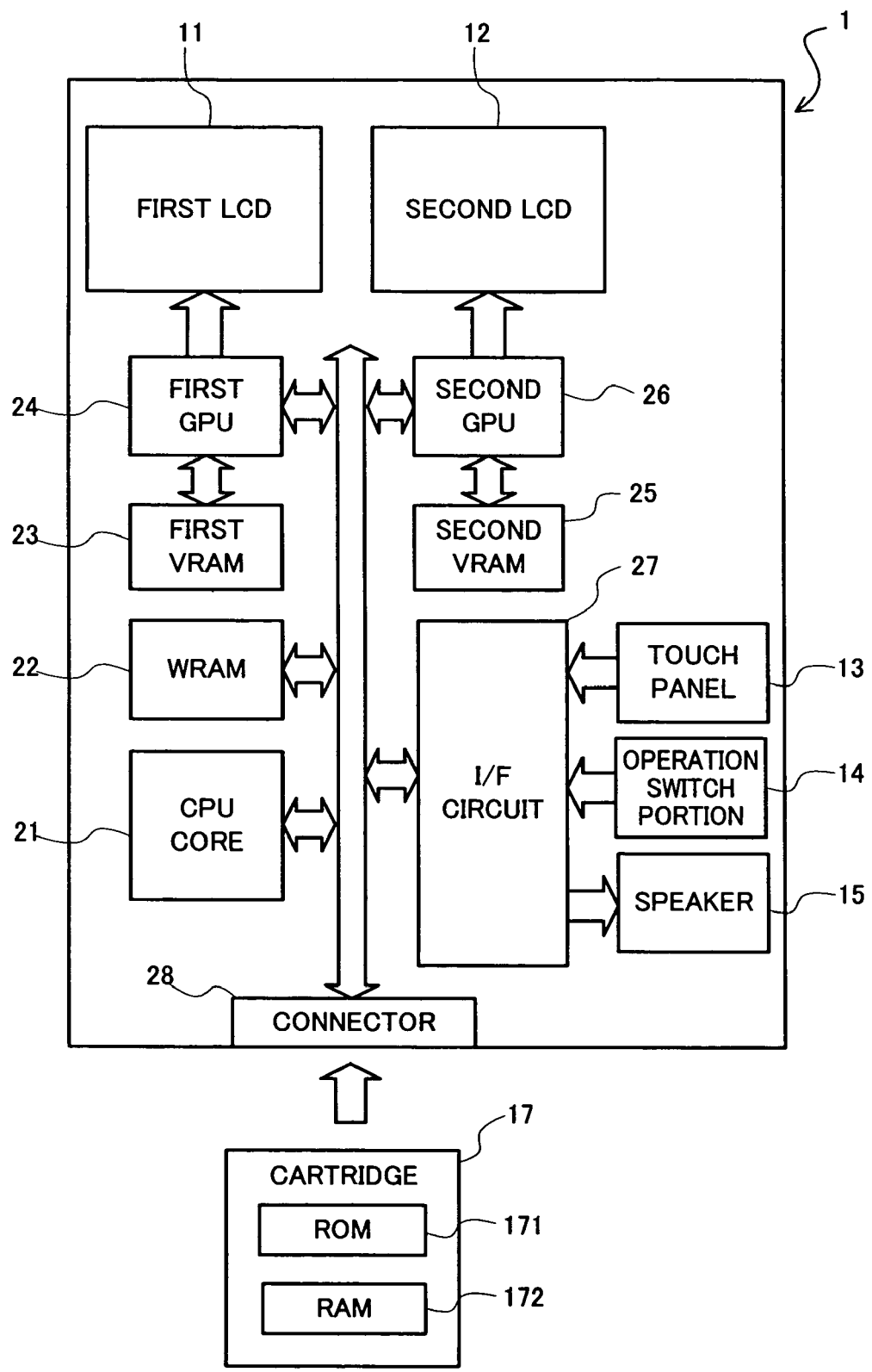
FIG. 2 is a block diagram showing the internal configuration of the game device 1.

Next, referring to FIG. 2, the internal configuration of the game device 1 will be described. FIG. 2 is a block diagram showing the internal configuration of the game device 1. In FIG. 2, a CPU core 21 is mounted in the electronic circuit board housed in the housing 18a. A connecter 28 for connection to the cartridge 17 is connected to the CPU core 21 via a predetermined bus, and an input/output interface (I/F) circuit 27, a first graphic processing unit (first GPU) 24, a second graphic processing unit (second GPU) 26, and a working RAM (WRAM) 22 are also connected to the CPU core 21 via predetermined buses.

The cartridge 17 is removably connected to the connector 28. The cartridge 17 is a storage medium for storing a game program, as described above. More specifically, a ROM 171 for storing a game program and a RAM 172 for rewritably storing backup data are mounted therein. The game program stored in the ROM 171 of the cartridge 17 is loaded onto the WRAM 22, and the game program loaded onto the WRAM 22 is executed by the CPU core 21. Data for generating temporary data or images that are obtained by the CPU core 21 executing the game program are stored in the WRAM 22.

The touch panel 13, the operation switch portion 14, and the speaker 15 are connected to the I/F circuit 27. The speaker 15 is positioned on the inner side of the sound-through hole 15b.

A first video RAM (hereinafter, referred to as "VRAM") 23 is connected to the first GPU 24, and a second video RAM (hereinafter, referred to as "VRAM") 25 is connected to the second GPU 26. The first GPU 24 generates a first game image, based on data for generating an image stored in the WRAM 22, in response to an instruction from the CPU core 21. The generated first game image is rendered in the first VRAM 23 by the first GPU 24. The second GPU 26 generates a second game image, based on data for generating an image stored in the WRAM 22, in response to an instruction from the CPU core 21. The generated second game image is rendered in the second VRAM 25 by the second GPU 26.

The first VRAM 23 is connected to the first LCD 11, and the second VRAM 25 is connected to the second LCD 12. The first GPU 24 outputs the first game image rendered in the first VRAM 23 to the first LCD 11 in response to an instruction from the CPU core 21. Then, the first LCD 11 displays the first game image output from the first GPU 24. The second GPU 26 outputs the second game image rendered in the second VRAM 25 to the second LCD 12 in response to an instruction from the CPU core 21. Then, the second LCD 12 displays the second game image output from the second GPU 26.

Hereinafter, the game process executed in the game device 1 by a game program stored in the cartridge 17 will be described. According to certain exemplary embodiments, only the first LCD 11 whose display screen is covered with the touch panel 13 is used as the display device. Therefore, the game device that executes a game program according to the present invention may have a structure in which the second LCD 12 is not included. In other words, the game program according to the present invention may be executed by a game device, PDA or the like that includes only one display device.

Figure 3:
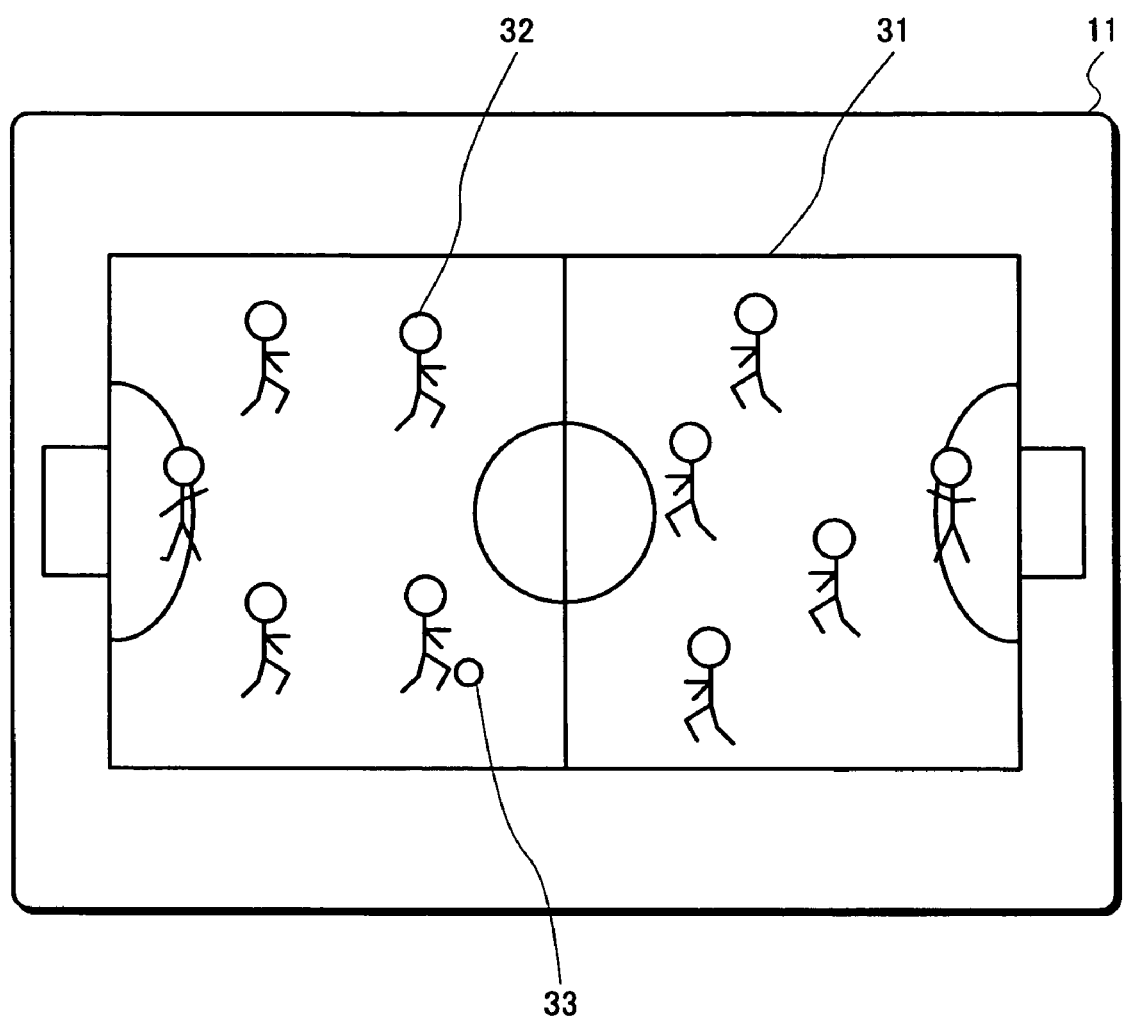
FIG. 3 is a view showing an example of a game image in a certain exemplary embodiment.

FIG. 3 is a view showing an example of a game image in this embodiment. This embodiment will be described by taking a soccer (futsal) game as shown in FIG. 3. The game image displayed in the first LCD 11 includes a field 31, a plurality of player objects 32 representing soccer players and a ball (ball object) 33. The players play a soccer game by operating the plurality of player objects 32, using the touch panel 13. For example, the player plays a soccer game by operations such as moving the player objects 32 and letting the player objects 32 kick the ball.

FIGS. 4A to 4D are views for illustrating the manner of operation in the soccer game in this embodiment. In this embodiment, the operation of the players to the player objects 32 includes the following two operations. A first operation is to moving the player objects 32 (moving operation). When a player object 32 is holding (keeping) the ball, the moving operation is an operation of letting the player object 32 dribble. A second operation is an operation of letting the player object 32 that is keeping the ball kick the ball (kicking operation). The player performs the moving operation and the kicking operation, using the touch panel 13.

Figure 4A:
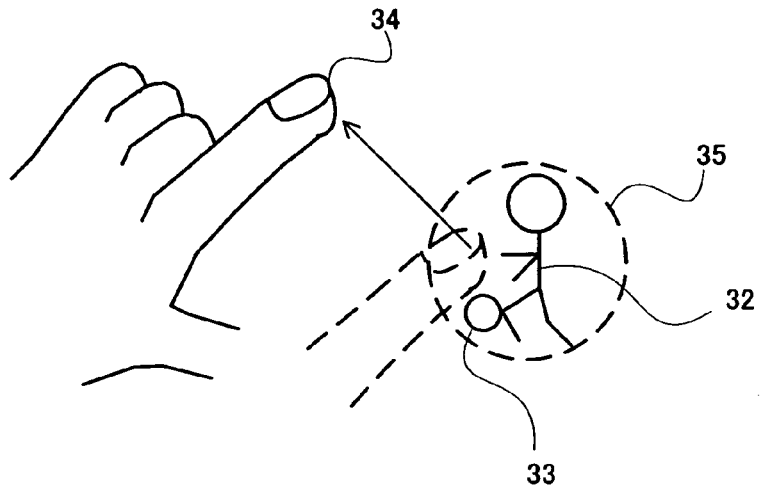
FIGS. 4A to 4D are views for illustrating the manner of operation in a soccer game in a certain exemplary embodiment.

FIG. 4A is a view for illustrating the moving operation. When performing the moving operation, the player performs an action of drawing a straight line on the touch panel 13. Specifically, an input of drawing a line starting from the vicinity of the player object 32 displayed on the screen with a finger 34 is performed on the touch panel 13. More specifically, when the locus of an input (input locus) of the player with respect to the touch panel 13 is originated from within a determination area 35 including a player object 32, the moving operation is performed with respect to that player object 32. Herein, the determination area 35 is set for each player object 32. The size of the determination area 35 is previously determined. In this embodiment, the shape of the determination area is a circle with the position of the player object (the center of the player object displayed on the screen) as its center. The determination area 35 moves together with the player object 32. FIGS. 4A to 4D show the determination area 35, but in this embodiment, the determination area 35 is not actually shown in the screen.

The arrow shown in FIG. 4A represents an input locus. The player performs an input so that the input locus results in a straight line extending in the direction in which the player desires to move the player object 32. In other words, in the case of the moving operation, the player object 32 moves in the direction in which the straight line of the input locus extends. Thus, the player can move the player object 32 in the direction in which the input locus extends. In FIG. 4A, this embodiment has been described by taking a player object 32 holding a ball (player object 32 keeping a ball) as an example, but the moving operation can be performed in the same manner when the player object 32 does not hold a ball.

Figure 4B:
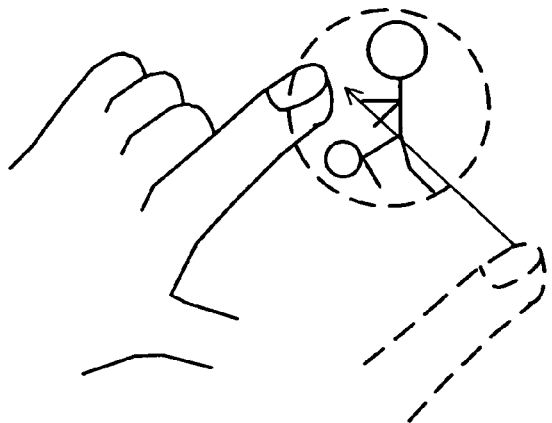
Figure 4C:
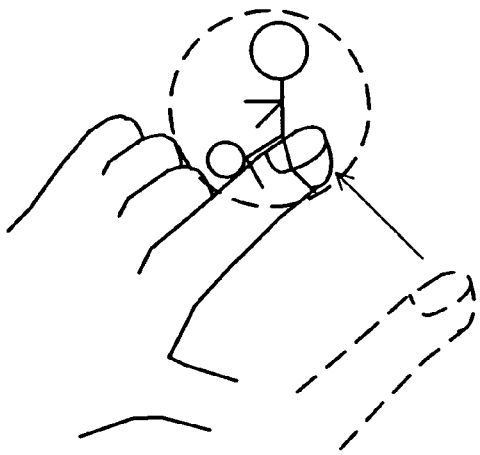
Figure 4D:
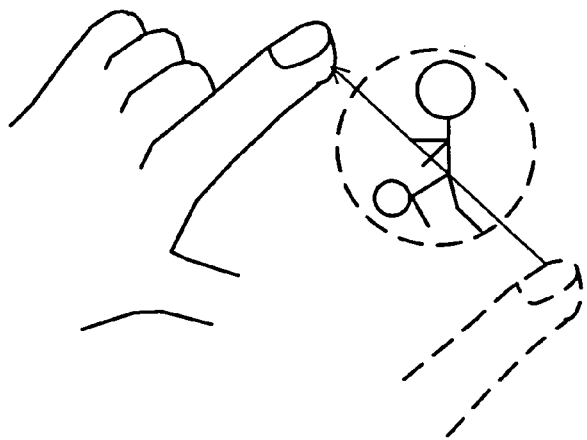

FIGS. 4B, 4C and 4D are views for illustrating the kicking operation. When performing the kicking operation, in the same manner as performing the moving operation, the player performs an action of drawing a straight line on the touch panel 13. Specifically, an input locus whose starting point is outside of the determination area 35 is inputted on the touch panel 13. The player object 32 that is to kick the ball is a player object the determination area 35 of which is included in the input locus. In this case, the ending point of the input locus may be within the determination area 35 and be ahead of the player object 32, as shown in FIG. 4B, or may be within the determination area 35 and be backward from the player object 32, as shown in FIG. 4C. Alternatively, the ending point of the input locus may be in a position at which the input locus traverses the determination area 35, that is, a position outside of the determination area 35, as shown in FIG. 4D. The player performs an input in such a manner that the straight line of the input locus extends in the direction in which the player desires to let the player object 32 kick the ball 33. In other words, in the case of the kicking operation, the ball 33 moves in the direction in which the straight line of the input locus extends. Thus, the player can let the player object 32 perform the operation of kicking a ball in the direction in which the input locus extends.

As described above, in this embodiment, the player can perform the moving operation and the kicking operation by drawing a linear input locus on the touch panel 13. In other words, in this embodiment, it is possible to operate two different operations of the moving operation and the kicking operation with one kind of action of drawing a linear input locus. A single action allows a plurality of kinds of operations, so that the player can perform the game operation in a simple manner. In this embodiment, the direction in which the linear input locus extends is the direction that is designated by the player, that is, the direction in which the player object 32 or the ball 33 moves. Hereinafter, the direction in which the input locus extends is referred to as a "designated direction".

Figure 5A:
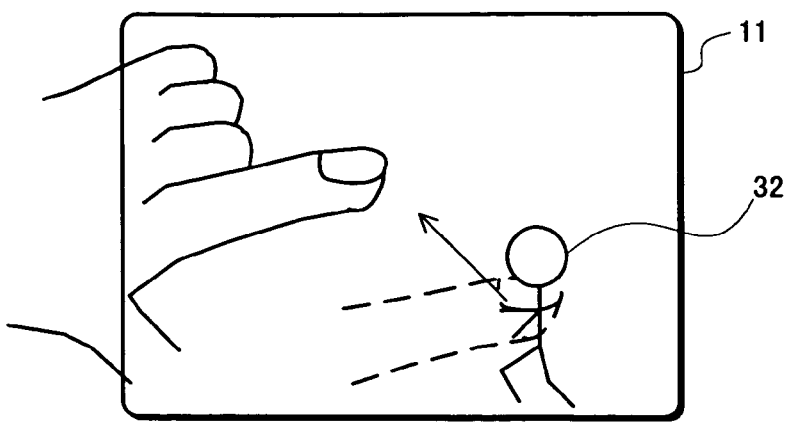
FIGS. 5A to 5D are views showing an example of display on a screen when performing a moving operation.
Figure 5B:
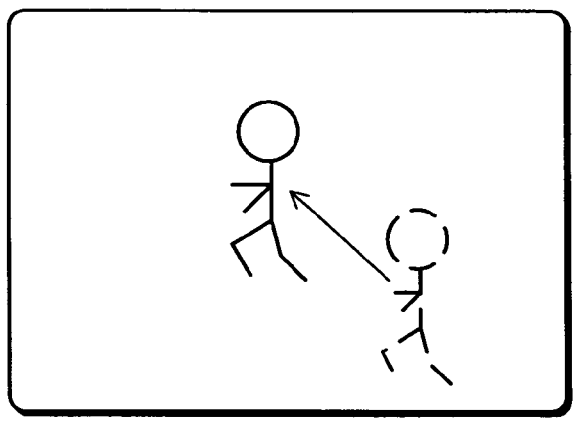
Figure 5C:
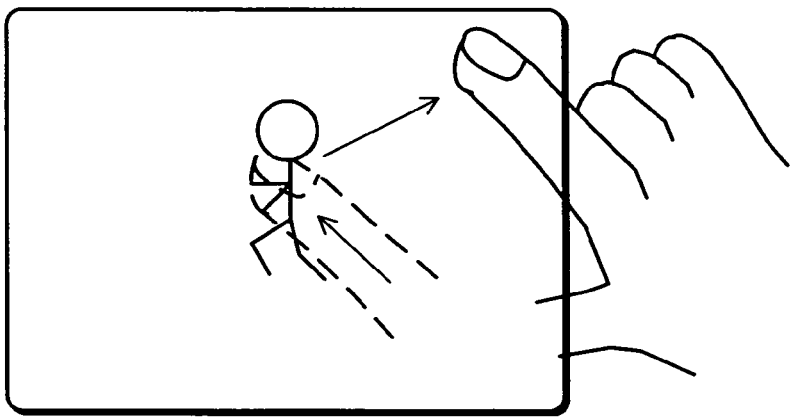
Figure 5D:
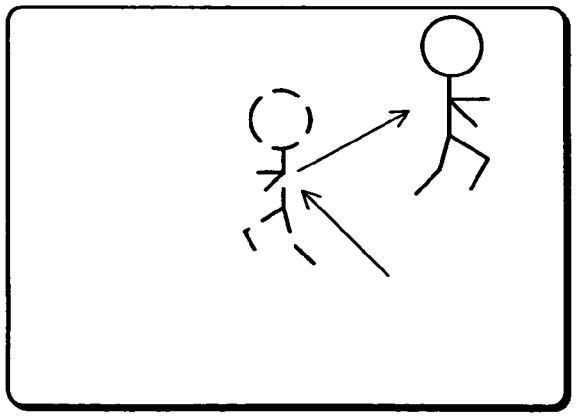

Next, an example of screen display of the game in this embodiment will be described. FIGS. 5A to 5D are views showing an example of screen display when performing the moving operation. In FIGS. 5A to 5D, a portion of the field 31 that is enlarged, compared with the game image shown in FIG. 3, is displayed, and only one player object of the plurality of player objects is displayed. In this embodiment, as the game image, the entire field 31, which is a game space, may be displayed, or only a portion of the field 31 may be displayed. In the example of display screen shown in FIG. 5A, the player object 32 is in a halt state on the field 31. In this state, when the player performs the moving operation of designating a direction to the upper left on the screen (FIG. 5A), the player object 32 starts an action of moving in the upper left direction (FIG. 5B). In this embodiment, the direction in which the player object 32 is to move is determined after the end of the moving operation, and after the determination of the direction, the moving action of the player object 32 starts. The player object 32 continues to move in the designated direction until the player performs the next moving operation. When the moving operation of designating a direction different from the present moving direction is performed during the movement of the player object 32 (FIG. 5C), the player object 32 starts to move in the direction designated by the new moving operation (FIG. 5D).

Figure 6A:
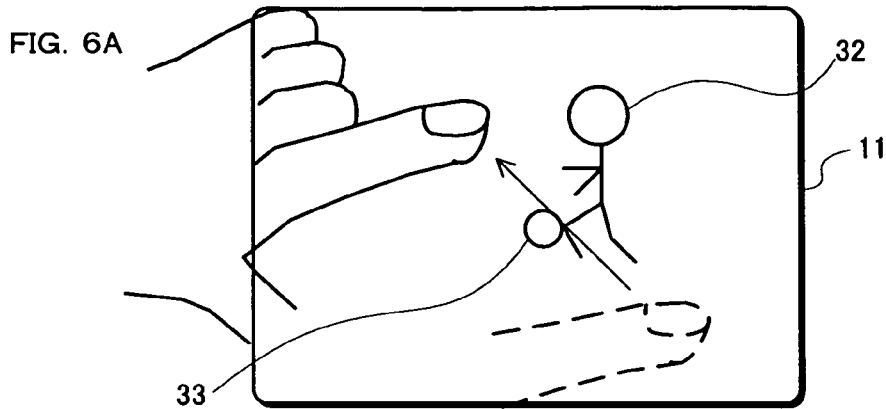
FIGS. 6A to 6D are views showing an example of display on a screen when performing a kicking operation.
Figure 6B:
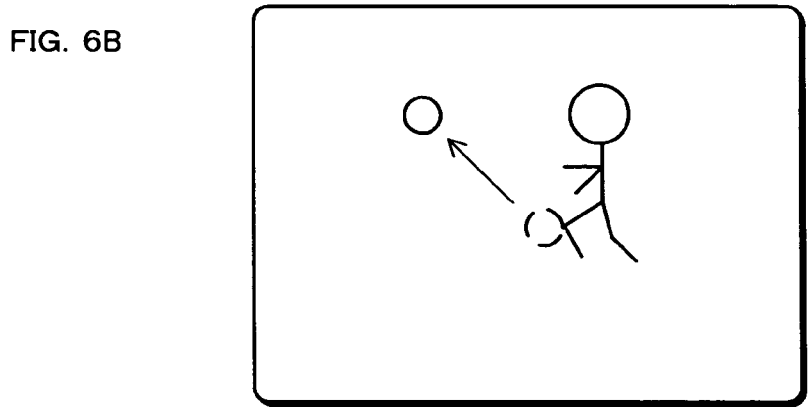
Figure 6C:
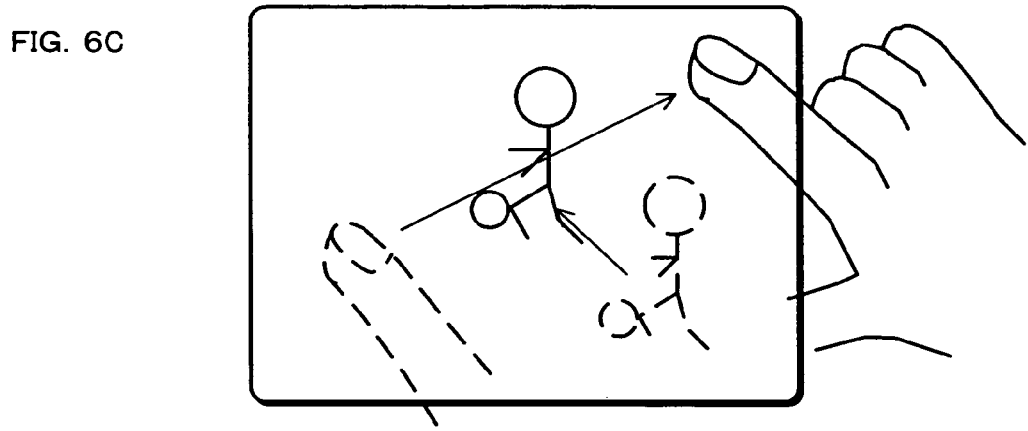
Figure 6D:
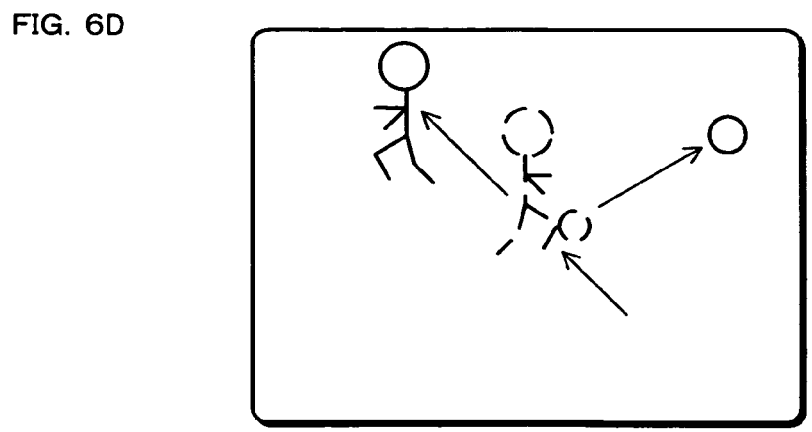

FIGS. 6A to 6D are views showing an example of screen display when performing the kicking operation. In the example of display screen shown in FIG. 6A, the player object 32 is in a halt state, keeping the ball 33. In this state, when the player performs the kicking operation with respect to the player object 32, the player object 32 starts an action of kicking the ball 33 (kicking action) toward the designated direction for the kicking operation (FIG. 6B). In the example of display screen shown in FIG. 6C, the player object 32 is dribbling, that is, the player object 32 is moving together with the ball 33. When the player performs the kicking operation in this state (FIG. 6C), the player object 32 performs an action of kicking the ball 33 in the designated direction for the kicking operation, and then continues to move in the designated direction for the moving operation (FIG. 6D). The ball 33 moves toward the designated direction for the kicking operation. The position at which the player object 32 performs the action of kicking the ball is the position at which the kicking operation has ended, that is, the position of the player object 32 at the point when the finger of the player is detached from the touch panel 13.

Figure 7:
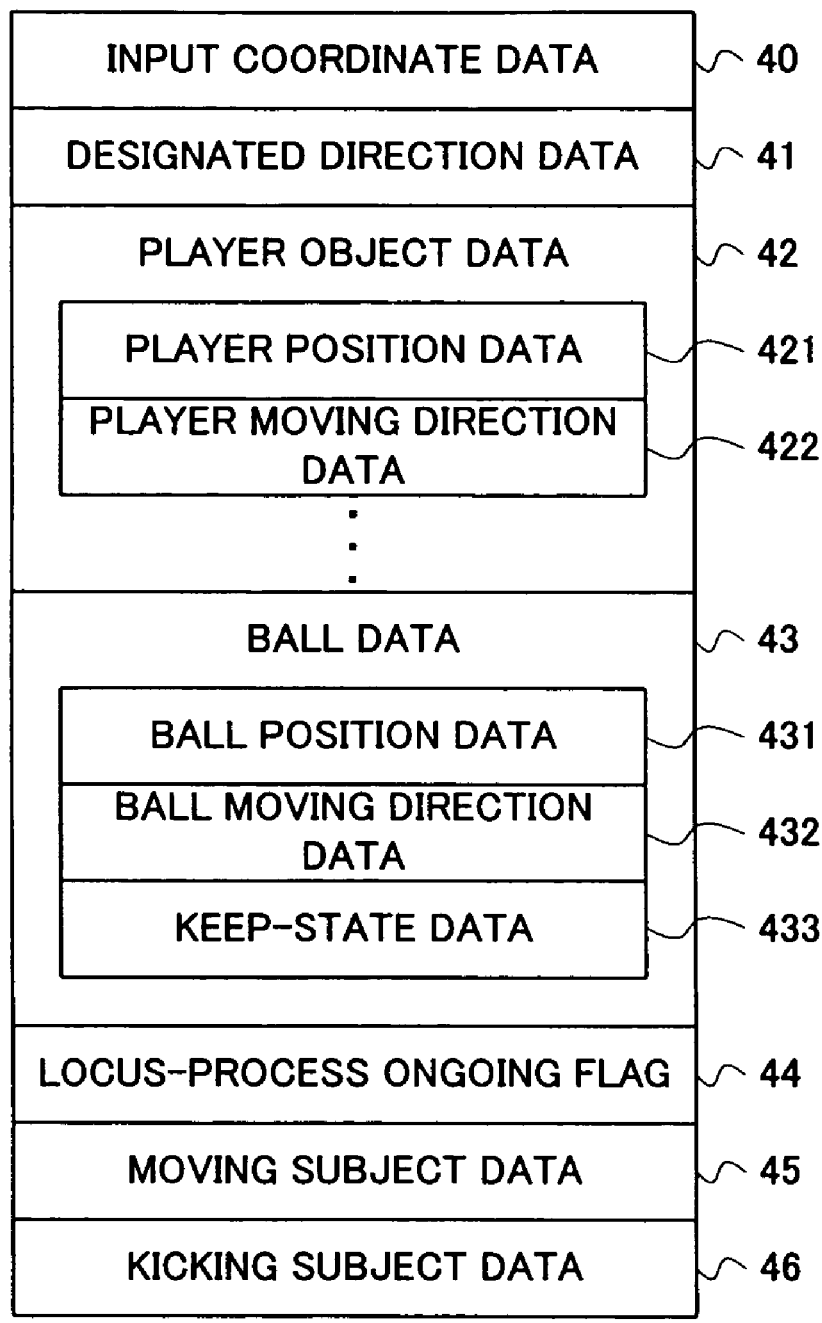
FIG. 7 is a diagram showing a memory map of a WRAM 22 of the game device 1.

Next, the detail of the game process executed by the game device 1 will be described. First, data stored in the WRAM 22 during the game process will be described. FIG. 7 is a view showing a memory map of the WRAM 22 of the game device 1. As shown in FIG. 7, during the game process, input coordinate data 40, designated direction data 41, player object data 42, ball data 43, locus-process ongoing flag 44, moving subject data 45, and kicking subject data 46 are stored in the WRAM 22.

The input coordinate data 40 represents a coordinate (input coordinate) on the game screen in response to the input to the touch panel 13. The input coordinate data 40 contains a group of coordinate values showing the results of continuous input at one time. In other words, data of an input coordinate is added and stored in the WRAM 22 while input to the touch panel 13 by the player is continuously detected. The data of input coordinates are not erased during the period in which the input is detected, and when different input is newly detected, the input coordinate data 40 showing the previous input is erased. The designated direction data 41 shows the designated direction that is determined based on the coordinate values shown by the input coordinate data 40.

The player object data 42 represents various information regarding the state of the player object. More specifically, the player object data 42 includes player position data 421 and player moving direction data 422. The player position data 421 represents the position of the player object on the field. The player moving direction data 422 represents the moving direction of the player object. The player object data 42 includes speed data representing the moving speed of the player object, ID for identifying the player object and the like. In FIG. 7, only one kind of player object data 42 is shown, but the player object data 42 is prepared for every player object that appears in the game.

The ball data 43 represents various information regarding the state of the ball. More specifically, the ball data 43 includes ball position data 431, ball moving direction data 432 and keep-state data 433. The ball position data 431 represents the position of the ball on the field. The ball moving direction data 432 represents the moving direction of the ball. The keep-state data 433 represents whether or not the ball is kept and which player object is keeping the ball when the ball is kept. More specifically, when the ball is kept, the ID of the player object that is keeping the ball is set in the keep-state data 433. When the ball is not kept, data representing "undetermined" is set in the keep-state data 433. In the initial state at the game start, the keep-state data 433 represents "undetermined".

The locus-process ongoing flag 44 shows whether or not the player is in the process of inputting to the touch panel 13. More specifically, while the player is in the process of inputting to the touch panel 13, the status in which the locus-process ongoing flag 44 is up (ON status) is set. While the player is not in the process of inputting to the touch panel 13, the status in which the locus-process ongoing flag 44 is down (OFF status) is set.

The moving subject data 45 represents the player object that is subjected to the moving operation. More specifically, when there is a player object that is subjected to the moving operation, the ID of this player object is set in the moving subject data 45. On the other hand, when no player object is subjected to the moving operation, data representing "undetermined" is set in the moving subject data 45. The kicking subject data 46 represents the player object that is subjected to the kicking operation. More specifically, when there is a player object that is subjected to the kicking operation, the ID of this player object is set in the kicking subject data 46. On the other hand, when no player object is subjected to the kicking operation, data representing "undetermined" is set in the kicking subject data 46.

Figure 8:
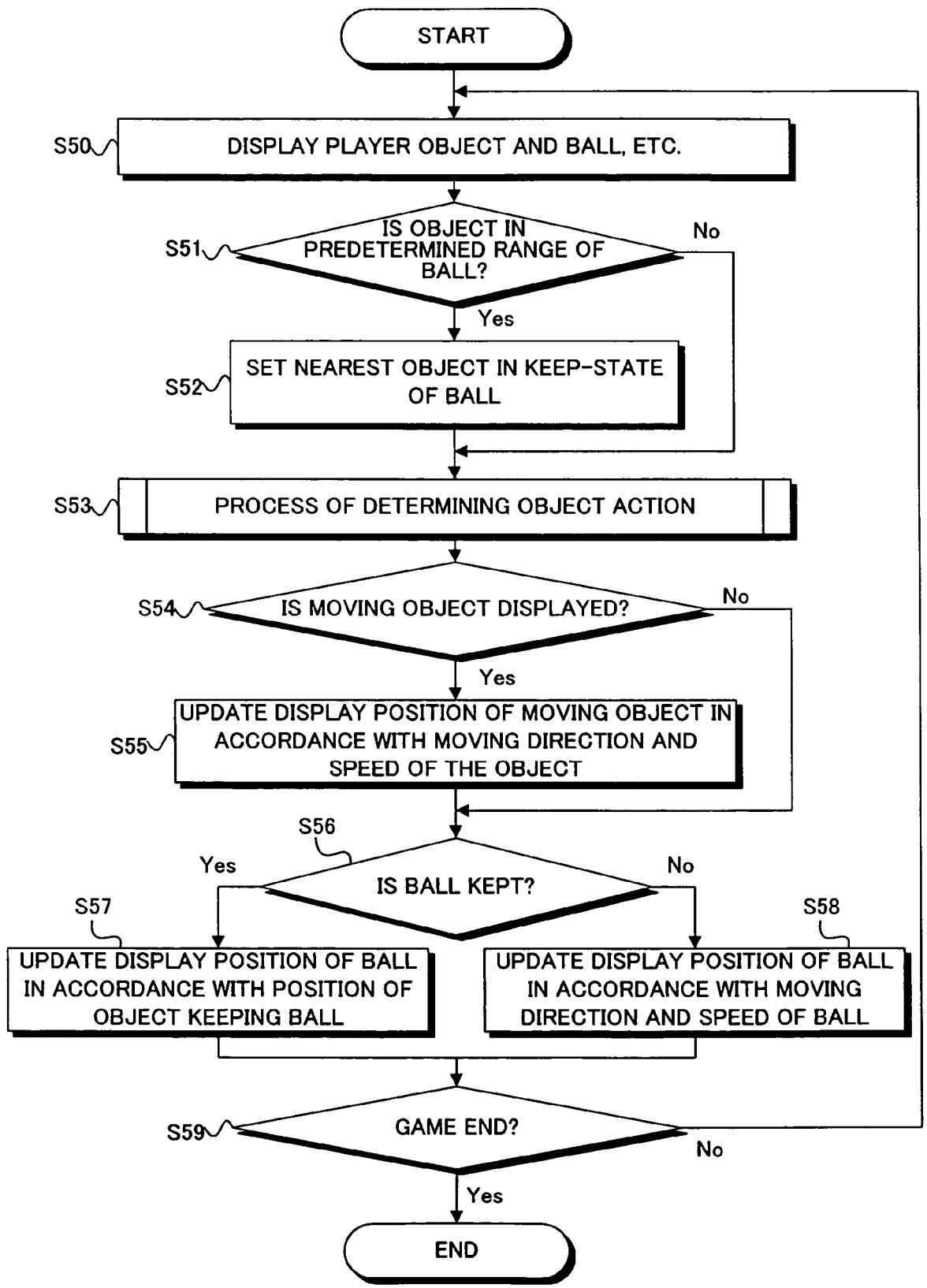
FIG. 8 is a flowchart showing the flow of the game process executed in the game device 1.

Next, the flow of the game process executed in the game device 1 by the game program according to the present invention will be described with reference to FIGS. 8 to 10. FIG. 8 is a flowchart showing the flow of the game process executed in the game device 1. When the power source of the game device 1 is turned on, the CPU core 21 of the game device 1 executes a start program stored in a boot ROM (not shown), and initializes the units such as the WRAM 22. Then, the game program stored in the cartridge 17 is read in the WRAM 22, and execution of the game program starts. Consequently, a game image is displayed in the first LCD 11 via the first GPU 24, and thus the game is started. The flowchart shown in FIG. 8 shows the game processes after the game is started.

In FIG. 8, first in step 50 ("step" is referred to as "S" in the drawings), a game image including player objects, a ball and a field is displayed in the first LCD 11. More specifically, a portion of or the entire area of the field and the player objects and the ball positioned within that area are displayed. The position of each player object is determined based on the player position data 421 stored in the WRAM 22. The position of the ball is determined based on the ball position data 431 stored in the WRAM 22. At the start of the game, predetermined initial values are set for the player position data 421 and the ball position data 431. After the game is started, in steps 55, 57 and 58, which will be described later, the player position data 421 and the ball position data 431 are updated, and consequently, the player object and the ball are moved and displayed. The processes of steps 50 to 59 are performed during one frame from when one game image is displayed to when the next game image is displayed.

In step 51 next to step 50, it is determined whether or not the player object is within a predetermined distance from the ball. This predetermined game program is previously determined in the game program. The determination in step 51 is performed by comparing the ball position data 431 and the player position data 421 of each player object. In the determination in step 51, it is determined that there is no player object within the predetermined distance from the ball, the process of step 52 is skipped and the process of step 53 is performed. On the other hand, in the determination in step 51, it is determined that there is a player object within the predetermined distance from the ball, the process of step 52 is performed. That is, in step 52, the ball is set in the keep-state with respect to the player object that is the nearest to the ball. More specifically, the keep-state data 433 stored in the WRAM 22 is updated so as to represent the ID of the player object that is the nearest the position of the ball. Thus, in the processes after this step, it is determined that the ball is kept by the player object that is the nearest to the position of the ball. After the process of step 52, the process of step 53 is performed.

In step 53, a process of determining an object action is performed. The process of determining an object action is a process of determining the moving direction of the player object and the ball. Hereinafter, the detail of the process of determining an object action will be described with reference to FIG. 9.

Figure 9:
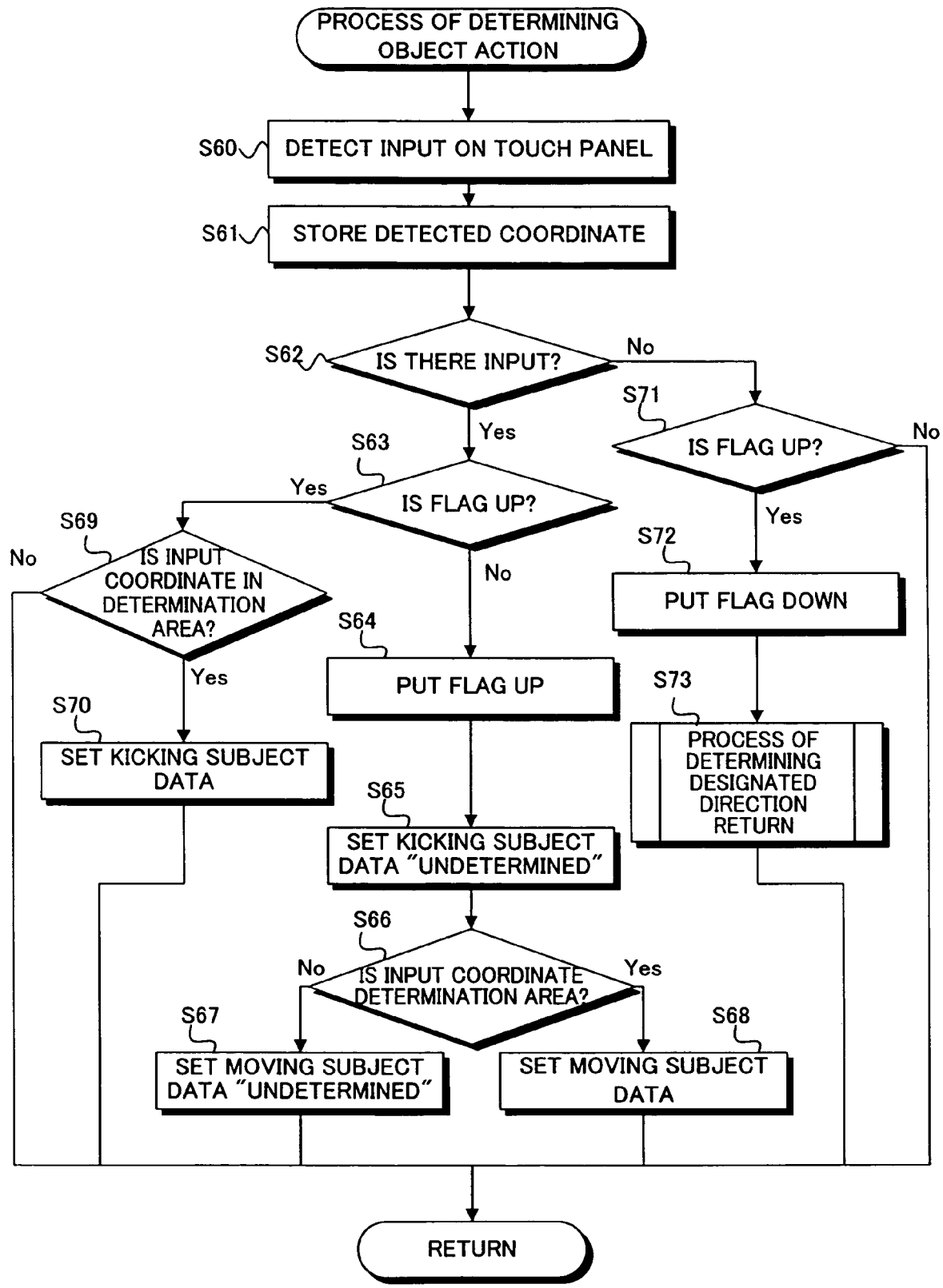
FIG. 9 is a flowchart showing the flow of a detailed process of step 53 shown in FIG. 8.

FIG. 9 is a flowchart showing the flow of the detailed process of step 53 shown in FIG. 8. In the process of determining an object action, first, in step 60, an input to the touch panel 13 by the player is detected. More specifically, the CPU core 21 acquires the input coordinate showing the position of the input from the touch panel 13. In the following step 61, the input coordinate acquired in step 60 is stored in the WRAM 22. More specifically, data representing the input coordinate is added to the input coordinate data 40. When there is no input to the touch panel 13 by the player, no coordinate value is acquired in step 60, and no data is stored in the WRAM 22 in step 61.

In step 62 next to step 61, it is determined whether or not there has been an input to the touch panel 13 by the player. This determination is performed based on whether or not the input coordinate was acquired in step 60. In the determination of step 62, when it is determined that there was an input to the touch panel 13 by the player, the process of step 63 is performed. That is to say, the processes of steps 63 to 70 are performed while the player is in the process of inputting to the touch panel 13. On the other hand, in the determination of step 62, when it is determined that there was no input to the touch panel 13, the process of step 71 is performed. That is to say, the processes of steps 71 to 73 are performed when there is no input to the touch panel 13.

First, the processes that are performed while the player in the process of inputting to the touch panel 13 (steps 63 to 70) will be described. In step 63, it is determined whether or not the locus-process ongoing flag 44 stored in the WRAM 22 is up. The process of step 63 is a process for determining whether or not the input by the player has just started (i.e., the starting point of the input locus has just been detected) or the input by the player already has been started (i.e., a point after the starting point of the input locus has been detected). In the determination in step 63, when the locus-process ongoing flag 44 is up, the step 64 is performed. On the other hand, in the determination in step 63, when the locus-process ongoing flag 44 is not up, the step 69 is performed. Therefore, at the point when an input to the touch panel 13 by the player is detected for the fist time, the process of step 64 is performed, and during the period in which the input continues after that, the process of step 69 is performed.

First, the processes that are performed at the point when an input to the touch panel 13 by the player is detected for the first time (steps 64 to 68) will be described. In step 64, the status is updated to a status in which the locus-process ongoing flag 44 stored in the WRAM 22 is up. In the following step 65, the kicking subject data 46 is set to "undetermined". More specifically, the content of the kicking subject data 46 stored in the WRAM 22 is updated to the content showing "undetermined".

In step 66 next to step 65, it is determined whether or not the input coordinate is included in the determination area of any player object. Here, the input coordinate is the input coordinate stored as the input coordinate data 40 in the immediately previous step 61. In step 66, the input coordinate is a coordinate representing the starting point of the input locus. Therefore, the process of step 66 is a process for determination as to whether or not the starting point of the input locus by the player is positioned within the determination area, that is, whether or not the operation of the player is a movement operation.

The process of the step 66 is performed by comparing the player position data 421 of each player object with the input coordinate stored as the input coordinate data 40 in the immediately previous step 61. More specifically, the coordinate represented by each player position data 421 (coordinate on the field) is converted into a coordinate representing the position on the screen, and the distance between each converted coordinate and the input coordinate is calculated. As a result, there is player position data 421 for which the calculated distance is shorter than a specific (predetermined) distance, it is determined that the input coordinate is included in the determination area of the player object corresponding to the player position data 421. That is to say, it is determined that the operation of the player is a moving operation. On the other hand, there is no player position data 421 for which the calculated distance is shorter than the specific distance, it is determined that the input coordinate is not included in the determination area of any player object. That is to say, it is determined that the operation of the player is not a moving operation.

In the determination in step 66, when it is determined that the input coordinate is not included in the determination area of any player object (i.e., it is determined that the operation of the player is not a moving operation), the process of step 67 is performed. More specifically, in step 67, the moving subject data 45 stored in the WRAM 22 is set to "undetermined". After step 67, the process of determining an object action shown in FIG. 9 ends. On the other hand, in the determination in step 66, when it is determined that the input coordinate is included in the determination area of any player object (i.e., it is determined that the operation of the player is a moving operation), the process of step 68 is performed. That is, in step 68, the moving subject data 45 is set. More specifically, the content of the moving subject data 45 stored in the WRAM 22 is updated so as to represent the ID of the player object for which it was determined that input coordinate is included in the determination area in step 66. After step 68, the process of determining an object action shown in FIG. 9 ends.

Next, the processes (steps 69 and 70) that are performed during a period after an input to the touch panel 13 by the player is first detected and the input continues will be described. In step 69, it is determined whether or not the input coordinate is included in the determination area of any player object. Here, the input coordinate is the input coordinated stored as the input coordinate data 40 in the immediately previous step 61. In step 69, the input coordinate is a coordinate representing a point on the input locus (a point that is not the starting point). Therefore, the process of step 69 is a process for determining whether or not a point on the input locus by the player is within the determination area, that is, whether or not the operation by the player is a kicking operation. The detailed process content of step 69 is the same as step 66 described above.

In the determination of step 69, when it is determined that the input coordinate is not included in the determination area of any player object (the operation by the player is not a kicking operation), the process of determining an object action shown in FIG. 9 ends. On the other hand, in the determination of step 69, when it is determined that the input coordinate is included in the determination area of any player object (the operation by the player is a kicking operation), the process of step 70 is performed. That is, in step 70, the kicking subject data 46 is set. More specifically, the content of the kicking subject data 46 stored in the WRAM 22 is updated so as to represent the ID of the player object for which it was determined that input coordinate is included in the determination area. After step 70, the process of determining an object action shown in FIG. 9 ends.

As shown in the above steps 63 to 70, while an input is performed by the player, it is determined whether or not the input is a moving operation and whether or not the input is a kicking operation (steps 66 and 69). When the input is a moving operation, the player object that is subjected to the moving operation is specified (step 68). When the input is a kicking operation, the player object that is subjected to the kicking operation is specified (step 70).

Next, the processes (steps 71 to 73) that are performed when there is no input to the touch panel 13 by the player will be described. In step 71, it is determined whether or not the locus-process ongoing flag 44 stored in the WRAM 22 is up. In the determination of step 71, when the locus-process ongoing flag 44 is up, the processes of steps 72 and 73 are performed. On the other hand, in the determination of step 71, when the locus-process ongoing flag 44 is not up, the processes of steps 72 and 73 are skipped, and the process of determining an object action shown in FIG. 9 ends. The process of step 71 is a process for determining whether or not that point of time is immediately after the input to the touch panel 13 by the player is stopped. Then, when it is immediately after the input to the touch panel 13 by the player is stopped, the process (step 73, which will be described later) for determining the direction in which the player object and/or the ball moves is performed.

In step 72, the status is changed to one in which the locus-process ongoing flag 44 stored in the WRAM 22 is down. In the following step 73, the process of determining a designated direction is performed. The process of determining a designated direction refers to a process for determining the designated direction of the moving operation or the kicking operation by the player and determining the moving direction of the player object and/or the ball. Hereinafter, the process of determining a designated direction will be described more specifically with reference to FIG. 10.

Figure 10:
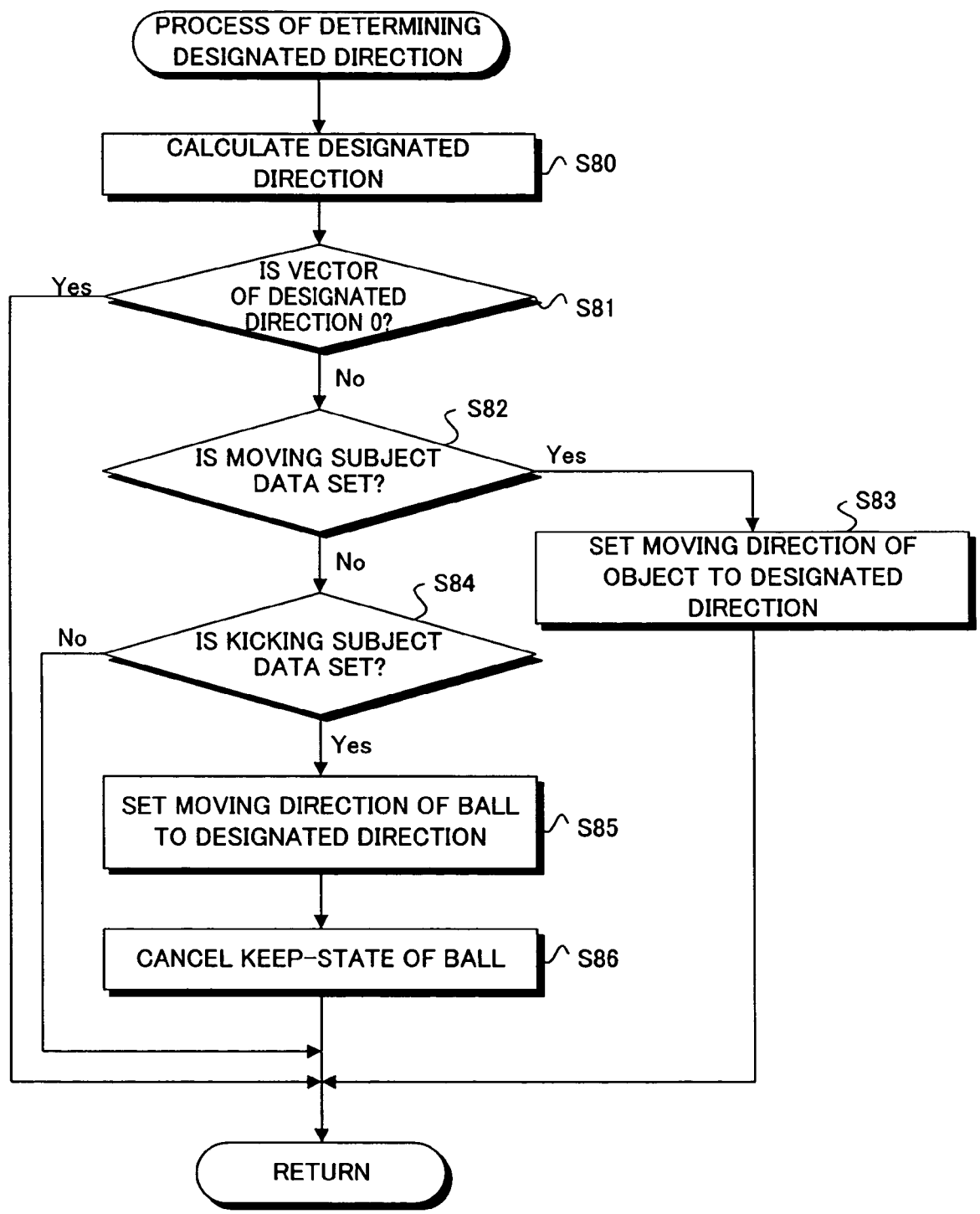
FIG. 10 is a flowchart showing the flow of a detailed process of step 73 shown in FIG. 9.

FIG. 10 is a flowchart showing the flow of the detailed process of step 73 shown in FIG. 9. In the process of determining a designated direction, first, in step 80, a designated direction is calculated. In this embodiment, the designated direction is calculated based on the starting point and the ending point of the input locus. More specifically, a vector connecting the starting point to the ending point of the input locus is calculated as the vector showing the designated direction. Data representing the coordinates of the staring points and the ending point of the input locus are included in the input coordinate data 40 stored in the WRAM 22. The data of the vector showing the designated direction calculated in step 80 is stored as the designated direction data 41 in the WRAM 22.

In step 81 next to step 80, it is determined whether or not the magnitude of the vector showing the designated direction calculated in step 80 is 0. In the determination of step 81, when the magnitude of the vector showing the designated direction is 0, the process of determining a designated direction ends. On the other hand, in the determination of step 81, when the magnitude of the vector showing the designated direction is not 0, the process of step 82 is performed. That is, in step 82, it is determined whether or not the moving subject data is set. As described above, the fact that the moving subject data has been set means that the player has performed a moving operation. In other words, the process of step 82 is a process for determining whether or not the immediately previous operation is a moving operation.

More specifically, when the moving subject data is set in step 82, that is, when the immediately previous operation is a moving operation, the process of step 83 is performed. That is, in step 83, the moving direction of the player object that is subjected to the moving operation is set to the designated direction. More specifically, the content of the player moving direction data 422 stored in the WRAM 22 is updated to the content showing the vector of the designated direction calculated in step 80. Thus, in step 55 for later, the player object moves in the designated direction. The player object for which the content of the player moving direction data 422 is updated in step 83 is a player object represented by the moving subject data 45. After step 83, the process of determining a designated direction ends.

On the other hand, when the moving subject data is not set in step 82, that is, when the immediately previous operation is not a moving operation, the process of step 84 is performed. That is, in step 84, it is determined whether or not the kicking subject data is set. As described above, the fact that the kicking subject data has been set means that the player has performed a kicking operation. In other words, the process of step 84 is a process whether or not the immediately previous operation is a kicking operation.

More specifically, when the kicking subject data is not set in step 84, that is, when the immediately previous operation is not a kicking operation, the process of determining a designated direction ends. On the other hand, when the kicking subject data is set in step 84, that is, when the immediately previous operation is a kicking operation, the process of step 85 is performed. That is, in step 85, the moving direction of the ball is set to the designated direction. More specifically, the content of the ball moving direction data 432 stored in the WRAM 22 is updated to the content showing the vector of the designated direction calculated in step 80. Thus, in step 58 for later, the ball moves in the designated direction. In step 86 next to step 85, the state in which the ball is kept is cancelled. More specifically, the content of the keep-state data 433 stored in the WRAM 22 is updated to data representing "undetermined". After step 86, the process of determining a designated direction ends.

When the process of determining a designated direction ends, the process of determining an object action shown in FIG. 9 ends. When the process of determining an object action ends, the process of step 54 shown in FIG. 8 is performed.

Referring back to FIG. 8, in step 54, it is determined whether or not a player object that is moving is displayed. Here, a player object that is moving is a player object represented by the moving subject data 45. In the determination of step 54, when it is determined that no moving player object is displayed, the process of step 55 is skipped, and the process of step 56 is performed. On the other hand, in the determination of step 54, when it is determined that a moving player object is displayed, the process of step 55 is performed. That is, in step 55, the position in which the player object is displayed is updated in accordance with the moving direction and the speed of the moving player object. More specifically, the player position data 421 stored in WRAM 22 is updated, based on the moving direction and the speed of the moving player object. Here, the moving direction and the speed of the moving player object are represented by the player moving direction data 422 and the speed data stored in the WRAM 22.

In step 56 next to step 55, it is determined whether or not the ball is kept. The determination of step 56 is performed by referring to the content of the keep-state data 433 stored in the WRAM 22. That is, when the keep-state data 433 represents "undetermined", it is determined that the ball is not kept, and when the keep-state data 433 represents other than "undetermined", it is determined that the ball is kept.

When it is determined that the ball is kept in the determination of step 56, the process of step 57 is performed. That is, in step 57, the position in which the ball is displayed is updated in accordance with the position of the player object that is keeping the ball. More specifically, the content of the ball position data 431 stored in the WRAM 22 is updated to a position represented by the player position data 421 of the player object that is keeping the ball. Here, the player object that is keeping the ball is a player object represented by the keep-state data 433. On the other hand, when it is determined that the ball is not kept in the determination of step 56, the process of step 58 is performed. That is, in step 58, the position in which the ball is displayed is updated in accordance with the moving direction and the speed of the ball. More specifically, the content of the ball position data 431 stored in WRAM 22 is updated, based on the moving direction and the speed of the ball. Here, the moving direction and the speed of the ball are represented by the ball moving direction data 432 stored in WRAM 22. The speed of the ball is calculated based on a predetermined algorithm. This algorithm may be any algorithm, and, for example, can be a algorithm in which the speed of the ball is gradually decreased, as time passes since a kicking operation was performed.

After step 57 or 58, in step 59, it is determined whether or not the game has ended. For example, it is determined that the game has ended, for example, when a predetermined time has passed since the start of the game or when an operation that ends that game is performed by the player. When it is determined that the game has ended, the game processes shown in FIG. 8 ends. On the other hand, when it is determined that the game has not yet ended, the process of step 50 is performed. Thereafter, the processes of steps 50 to 58 are repeated until it is determined that the game has ended.

In the above-described game process, the moving subject data 45 represents only one player object, but may represent a plurality of player objects. That is, in the above-described game process, only one player object is subjected to a moving operation, but a plurality of player objects may be subjected simultaneously to a moving operation. For example, the game device may store moving subject data representing the IDs of the player objects that were subjected to a moving operation in a plurality of past moving operations in the WRAM 22. In this case, in step 55 in FIG. 8, the display positions of the plurality of player objects are updated, so that the plurality of player objects can be moved at the same time. Alternatively, for example, the game device may store moving subject data representing the IDs of the player objects that were subjected to a moving operation in past moving operations in the WRAM 22. In this case, a player object that is subjected to a moving operation continues to move until the next moving operation is performed to the player object. In the above, the player object that has started to move in response to a moving operation may stop moving after a predetermined time has passed since the start of the moving operation.

As described above, according to the present invention, the player can perform a moving operation and a kicking operation with respect to player objects in a soccer game with a single action. That is, the player can play a complicated game operation with a simple action.

The above embodiment shows a configuration in which the touch panel 13 is used as an input device with which a position can be designated on the game screen, but the input device is not limited thereto. In another embodiment, the input device may be a mouse, for example.

Figure 11A:
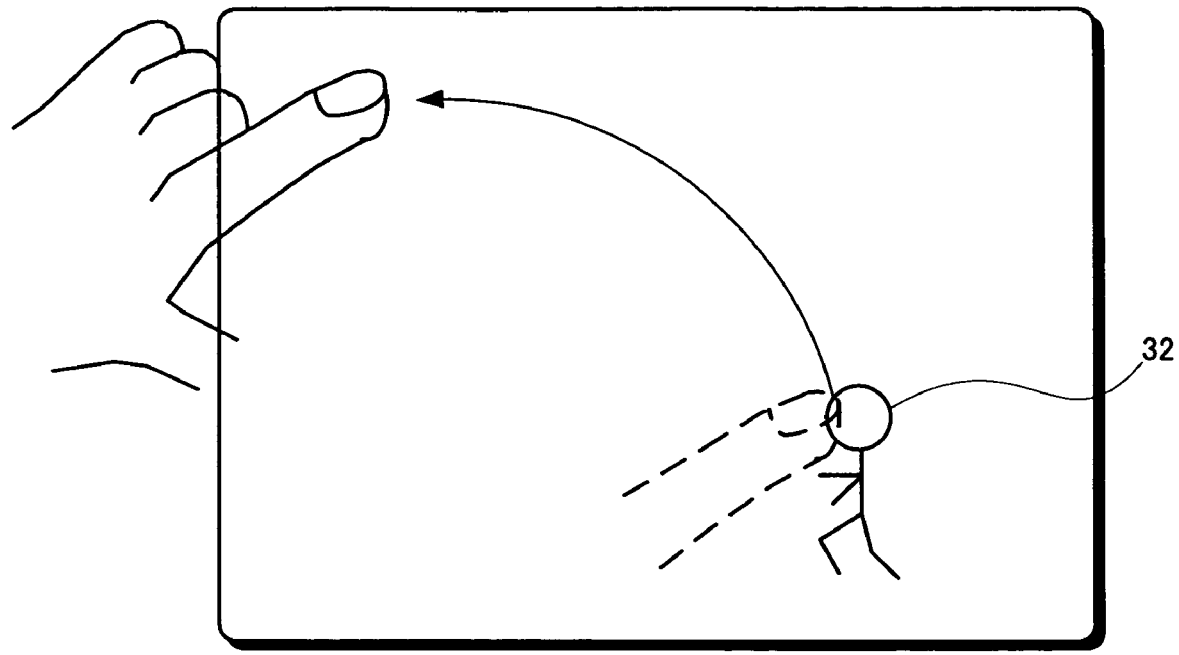
FIGS. 11A and 11B are views showing an example of moving operation in another exemplary embodiment.
Figure 11B:
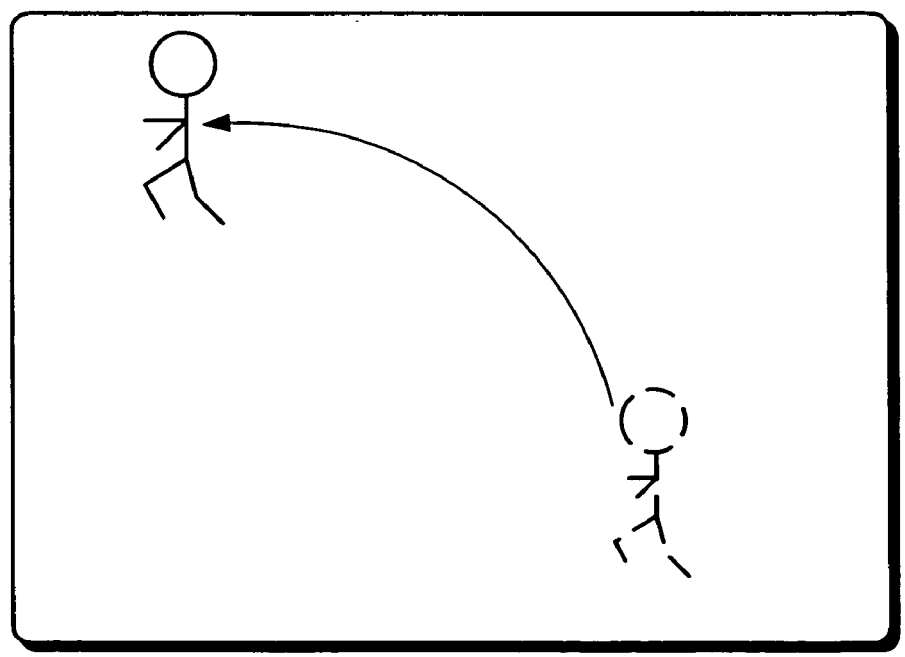

In the above embodiment, the designated direction is a direction of a straight line connecting the starting point and the ending point of an input locus that is actually drawn by the player. That is, the input locus by the player is assumed as a straight line in the game device and the game device calculates a designated direction based on the straight line. Therefore, in the above embodiment, the player object moves in the direction of the straight line connecting the starting point and the ending point of an input locus that is actually drawn by the player. Here, in another embodiment, the game device may let the player object move along a trajectory, for example, shown in FIG. 11A. FIGS. 11A and 11B are views showing another example of the moving operation in another embodiment of the present invention. In FIGS. 11A and 11B, when the player draws an arc-shaped input locus on the touch panel 13 (FIG. 11A), the player object moves along the input locus (FIG. 11B). Specifically, when a moving operation is performed by the player, the game device moves the player object that the player object passes through input coordinates at every predetermined time interval (e.g., every one frame) of the input coordinates constituting the input locus. More specifically, the CPU core 21 determines the position of the player object so that the player object passes through each of the input coordinate values included in the input coordinate data 40 stored in the WRAM 22. When the input locus is calculated based on the input coordinates at every predetermined time interval in this manner, the player object can be moved along a trajectory close to the input locus that has been actually drawn by the player. The method for calculating the designated direction is not limited to the above, and any method can be used, as long as they can calculate the designated direction based on the input locus. However, it is necessary that the method for calculating the designated direction for the moving operation is the same as the method for calculating the designated direction for the kicking operation so that the action of the player for the moving operation is the same as the action of the player for the kicking operation.

In the above embodiment, the determination area is not displayed on the screen, but the determination area may be displayed on the screen. When the determination area is displayed on the screen, the player can perform an operation accurately without making a mistake as to a moving operation or a kicking operation. In the case of a game such as a soccer game as described above in which a plurality of player objects are displayed on a screen, the determination area of only the player object that can perform a plurality of kinds of actions (two kinds of actions of the moving action and the kicking action in this embodiment) may be displayed. Herein, "the player object that can perform a plurality kinds of actions" refers to a player object that is keeping the ball in the soccer game. When the determination areas of all of the player objects displayed on the screen are displayed, the screen is very complicated and becomes difficult to understand. On the other hand, when the determination area of only the player object that can perform two kinds of actions is displayed, the screen is easy to understand. Furthermore, the player object that is keeping the ball can be displayed clearly.

In the soccer game of the above-described embodiment, the following case may happen. When the player is about to perform a moving operation to a player object that is not keeping the ball, the player erroneously performs an input of the starting point outside the determination area, and as a result, a moving operation is not successfully performed. Alternatively, the player may desire to perform only a moving operation without a kicking operation with respect to the player object. Therefore, in another embodiment, the determination area of a player object that is not keeping the ball may be larger than that of a player object that is keeping the ball. More specifically, since the player does not perform a kicking operation to player objects that are not keeping the ball, the determination areas of those player objects are made larger in order to ensure the moving operation. Thus, in another embodiment, the size of the determination area of the player object that can perform a plurality of kinds of actions may be different from that of the player objects that can perform only one kind of action. Thus, the operability with respect to the player objects can be improved.

Furthermore, for the purpose of improving the operability of the player objects, the following modification is possible. As a modification of the above-described embodiment, the player objects other than the player object that can perform a plurality of kinds of actions can accept only one kind of operation, regardless of the position of the starting point of the input locus by the player. In other words, regarding the player objects that can perform only one kind of action, for example, by enlarging the determination area of the player object to the maximum, those player objects can accept only one kind of operation, regardless of the position of the starting point of the input locus by the player.

In the above, the present invention has been described by taking a soccer game as an example of a game to which the present invention can be applied. However, the present invention can be applied to other games. For example, the present invention can be applied to a shooting game in which the player operates a human character carrying a gun. More specifically, it is possible to let the player perform an operation of moving the human character (corresponding to the moving operation in the soccer game) and an operation of letting the human character shoot (corresponding to the kicking operation in the soccer game) with a single operation pattern.

The present invention can be utilized in a game device for the purpose of, for example, letting the player object perform a plurality of actions with a simple game operation.

While the invention has been described in detail, the foregoing description is in all aspects illustrative and not restrictive. It is understood that numerous other modifications and variations can be devised without departing from the scope of the invention.

What is claimed is:

1. A storage medium storing a game program that lets a computer of a game device in which a game image including a player object that can be operated by a player is displayed on a display device function as:

input detecting programmed logic circuitry for detecting an input by the player;

coordinate storing programmed logic circuitry for detecting and storing coordinates on the game image corresponding to the input while the input by the player is detected by the input detecting programmed logic circuitry;

direction calculating programmed logic circuitry for, based on an input locus having a predetermined shape shown by the coordinates stored in the coordinate storing programmed logic circuitry, calculating a direction shown by the input locus;

determining programmed logic circuitry for determining whether or not a coordinate of a starting point stored first in the coordinate storing programmed logic circuitry is included in a predetermined range that is based on coordinates showing a position in which the player object is displayed in the game image;

a first action controller for controlling the player object to perform a first action in a direction calculated by the direction calculating programmed logic circuitry when it is determined that the coordinate of the starting point is included in the predetermined range by the determining programmed logic circuitry; and a second action controller for, when it is determined that the coordinate of the starting point is not included in the predetermined range by the determining programmed logic circuitry, further determining whether or not any coordinate other than the coordinate of the starting point is included in the predetermined range, and controlling the player object to perform a second action in a direction calculated by the direction calculating programmed logic circuitry when any of the coordinates other than the coordinate of the starting point is included in the predetermined range.

2. The storage medium according to claim 1, wherein the first action is an action of the player object itself, and the second action is an action that the player object performs to another player object.

3. The storage medium according to claim 2, wherein the game image includes the player object and a moving object that is an object different from the player object and moves together with the player object, the first action is an action in which the player object moves in the direction calculated by the direction calculating programmed logic circuitry, and the second action is an action in which the moving object moves in the direction calculated by the direction calculating programmed logic circuitry.

4. The storage medium according to claim 1, wherein the direction calculating programmed logic circuitry calculates a direction, using a straight line connecting a coordinate of a starting point and a coordinate of an ending point of the coordinates stored in the coordinate storing programmed logic circuitry as the input locus.

5. The storage medium according to claim 1, wherein the direction calculating programmed logic circuitry calculates a direction, using a trajectory constituted by coordinates detected at a predetermined time interval of the coordinates stored in the coordinate storing programmed logic circuitry as the input locus.

6. A game device in which a game image including a player object that can be operated by a player is displayed on a display device, comprising:

input detecting programmed logic circuitry for detecting an input by the player;

coordinate storing programmed logic circuitry for detecting and storing coordinates on the game image corresponding to the input while the input by the player is detected by the input detecting programmed logic circuitry;

direction calculating programmed logic circuitry for, based on an input locus having a predetermined shape shown by the coordinates stored in the coordinate storing programmed logic circuitry, calculating a direction shown by the input locus;

determining programmed logic circuitry for determining whether or not a coordinate of a starting point stored first in the coordinate storing programmed logic circuitry is included in a predetermined range that is based on coordinates showing a position in which the player object is displayed in the game image;

a first action controller for controlling the player object to perform a first action in a direction calculated by the direction calculating programmed logic circuitry when it is determined that the coordinate of the starting point is included in the predetermined range by the determining programmed logic circuitry; and a second action controller for, when it is determined that the coordinate of the starting point is not included in the predetermined range by the determining programmed logic circuitry, further determining whether or not any coordinate other than the coordinate of the starting point is included in the predetermined range, and controlling the player object to perform a second action in a direction calculated by the direction calculating programmed logic circuitry when any of the coordinates other than the coordinate of the starting point is included in the predetermined range.

7. The game device according to claim 6, wherein the first action is an action of the player object itself, and the second action is an action that the player object performs to another player object.

8. The game device according to claim 6, wherein the game image includes the player object and a moving object that is an object different from the player object and moves together with the player object, the first action is an action in which the player object moves in the direction calculated by the direction calculating programmed logic circuitry, and the second action is an action in which the moving object moves in the direction calculated by the direction calculating programmed logic circuitry.

9. The game device according to claim 6, wherein the direction calculating programmed logic circuitry calculates a direction, using a straight line connecting a coordinate of a starting point and a coordinate of an ending point of the coordinates stored in the coordinate storing programmed logic circuitry as the input locus.

10. The game device according to claim 6, wherein the direction calculating programmed logic circuitry calculates a direction, using a trajectory constituted by coordinates detected at a predetermined time interval of the coordinates stored in the coordinate storing programmed logic circuitry as the input locus.

11. A method used in a game device in which a game image including a player object that can be operated by a player is displayed on a display device, comprising:

detecting an input by the player;

detecting and storing coordinates on the game image corresponding to the input while the input by the player is detected;

based on an input locus having a predetermined shape shown by the stored coordinates, calculating a direction shown by the input locus;

determining whether or not a coordinate of a stored starting point is included in a predetermined range that is based on coordinates showing a position in which the player object is displayed in the game image;

controlling the player object to perform a first action in a calculated direction to be displayed on the display when it is determined that the coordinate of the starting point is included in the predetermined range; and when it is determined that the coordinate of the starting point is not included in the predetermined range, further determining whether or not any coordinate other than the coordinate of the starting point is included in the predetermined range, and controlling the player object to perform a second action to be displayed on the display in a calculated direction when any of the coordinates other than the coordinate of the starting point is included in the predetermined range.

* * * * *